US006551738B2

United States Patent
Kwan et al.

(10) Patent No.: US 6,551,738 B2
(45) Date of Patent: Apr. 22, 2003

(54) ELECTRONIC PRICE LABEL BATTERY STORAGE APPARATUS AND REPLACEMENT METHOD

(75) Inventors: Sik Piu Kwan, Suwanee, GA (US); Yoshitaka Utsumi, Kanagawa (JP)

(73) Assignee: NCR Corporation, Dayton, OH (US)

( * ) Notice: Subject to any disclaimer, the term of this patent is extended or adjusted under 35 U.S.C. 154(b) by 288 days.

(21) Appl. No.: 09/785,958

(22) Filed: Feb. 16, 2001

(65) Prior Publication Data

US 2002/0114992 A1 Aug. 22, 2002

(51) Int. Cl.[7] ............................................. H01M 2/10
(52) U.S. Cl. .................... 429/96; 429/97; 429/100; 429/9
(58) Field of Search ............................ 429/9, 96–100; 235/383, 454

(56) References Cited

U.S. PATENT DOCUMENTS

| 4,913,984 | A | * | 4/1990 | Shimizu | 429/97 |
|---|---|---|---|---|---|
| 5,039,580 | A | | 8/1991 | Mori et al. | 429/97 |
| 5,135,822 | A | * | 8/1992 | Okamoto | 429/97 |
| 5,149,604 | A | * | 9/1992 | Nakanishi | 429/97 |
| 5,504,475 | A | | 4/1996 | Houdou et al. | 340/825.35 |
| 5,673,180 | A | * | 9/1997 | Pernet | 361/756 |
| 5,771,005 | A | | 6/1998 | Goodwin, III | 340/825.35 |
| 5,901,035 | A | * | 5/1999 | Foster et al. | 361/683 |
| 6,042,962 | A | | 3/2000 | Ling | 429/99 |
| 6,293,463 | B1 | * | 9/2001 | Kato et al. | 235/383 |

OTHER PUBLICATIONS

04171655, Jun. 18, 1992, Japanese Patent Abstract.
61250965, Nov. 8, 1986, Japanese Patent Abstract.

* cited by examiner

*Primary Examiner*—Patrick Ryan
*Assistant Examiner*—Tracy Dove
(74) *Attorney, Agent, or Firm*—Paul W. Martin

(57) ABSTRACT

An electronic price label battery storage apparatus and replacement method which maintains power to a memory within the electronic price label during removal and replacement of a battery. The battery storage apparatus includes a battery compartment in the housing, a generally circular lid which is rotatable between a closed position and an open position, and wherein the lid includes a tab, and power terminals accessible from a rear surface of the housing which provide power to a memory within the electronic price label when a power source is coupled to the power terminals, wherein the power terminals are covered by the tab when the lid is in the closed position.

1 Claim, 4 Drawing Sheets

ELECTRONIC PRICE LABEL BATTERY STORAGE APPARATUS AND REPLACEMENT METHOD

BACKGROUND OF THE INVENTION

The present invention relates to electronic price labels (EPLs), and more specifically to an electronic price label battery storage apparatus and replacement method.

EPL systems typically include a plurality of EPLs for merchandise items in a transaction establishment. EPLs typically display the prices of corresponding merchandise items on store shelves and are typically attached to a rail along the leading edge of the shelves. A transaction establishment may contain thousands of EPLs to display the prices of the merchandise items. The EPLs are coupled to a central server from where information about the EPLs is typically maintained in an EPL data file. Price information displayed by the EPLs is obtained from a price look-up (PLU) data file and stored within an EPL price change record.

EPLs further include a memory for storing information, such as serial numbers and prices. The memory is typically a volatile memory, such as random access memory (RAM). Thus, EPLs further include a power source for maintaining the contents of the memory. The power source is typically a battery.

However, removal and replacement of the battery causes loss of memory contents. Reprogramming the EPL with a serial number and other critical data after battery replacement is a labor intensive, error prone, and costly process.

Therefore, it would be desirable to provide an electronic price label battery storage apparatus and replacement method which preserve the contents of the memory during battery replacement.

SUMMARY OF THE INVENTION

In accordance with the teachings of the present invention, an electronic price label battery storage apparatus and replacement method is provided.

The electronic price label battery storage apparatus includes a battery compartment in the housing, a generally circular lid which is rotatable between a closed position and an open position, and wherein the lid includes a tab, and power terminals accessible from a rear surface of the housing which provide power to a memory within the electronic price label when a power source is coupled to the power terminals, wherein the power terminals are covered by the tab when the lid is in the closed position.

It is accordingly an object of the present invention to provide an electronic price label battery storage apparatus and replacement method.

It is another object of the present invention to provide an electronic price label battery storage apparatus and replacement method which preserves the contents of a volatile memory.

It is another object of the present invention to provide an electronic price label battery storage apparatus and replacement method which is low in cost.

It is another object of the present invention to provide an electronic price label battery storage apparatus and replacement method which is low in cost.

It is another object of the present invention to provide an electronic price label battery storage apparatus and replacement method which uses an external power source during battery replacement.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
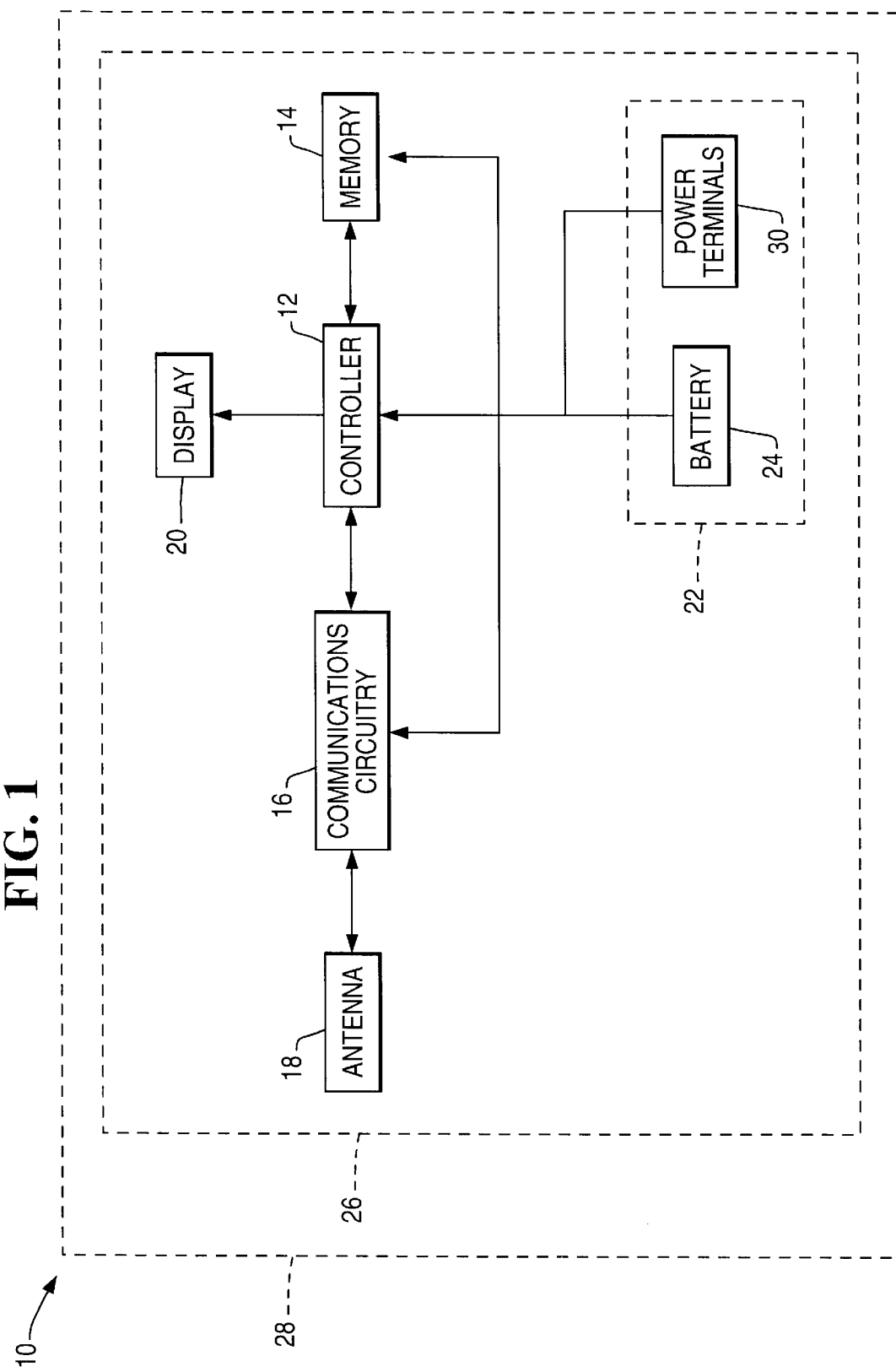
FIG. 1 is a block diagram of an EPL including the battery storage apparatus.
Figure 2:
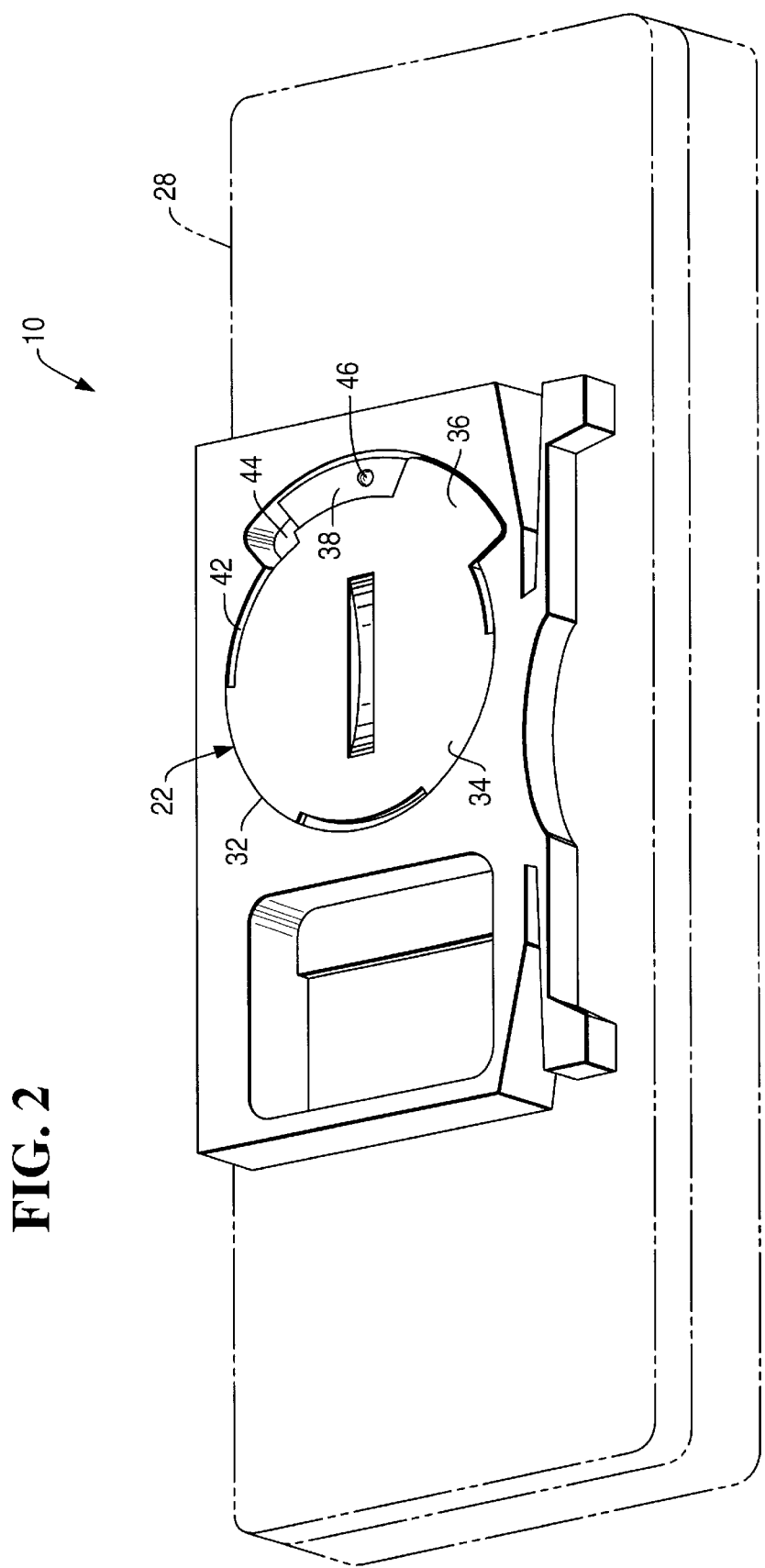
FIG. 2 is a perspective view the EPL showing a battery storage apparatus in a closed position.

Referring to FIGS. 1 and 2, EPL 10 includes housing 28 which contains printed circuit board 26. Mounted to printed circuit board are controller 12, memory 14, communications circuitry 16, antenna 18, display 20, and battery storage apparatus 22.

Controller 12 controls operation of EPL 10. Controller 12 processes commands from a host system, stores display information in memory 14, and controls display of the display information in accordance with commands from the host system. Display information may include price information, promotional information, and other information a store may wish to display. Controller 12 also stores identification information during initialization of the EPL. The identification information preferably includes a serial number and any additional information which is necessary address messages to EPL 10.

Memory 14 stores the display information and the identification information and is preferably a volatile random access memory, such as a static random access memory (SRAM).

Communications circuitry 16 receives messages from the host system and returns acknowledgments to the host system.

Antenna 18 works with communications circuitry 16 if EPL 10 communicates wirelessly.

Display 20 displays price and other information and is preferably a liquid crystal display (LCD).

Battery storage apparatus 22 stores battery 24 and includes power terminals 30 for receiving externally provided power.

With reference to FIG. 2, battery storage apparatus 22 further includes battery well 32 and lid 34.

Battery well 32 is similar in many respects to known battery wells with includes electrical contacts. Battery well 32 includes threads 42.

Lid 34 seals battery 24 within battery storage apparatus 22. Lid 34 rotates within threads 42. Lid 34 includes tab 36 which moves within recess 38.

Lid 34 is shown in a closed position. In the closed position, tab 36 covers power terminals 30, which are located in recess 38 of rear surface of housing 28. Lid 34 includes recess 40 into which a tool is inserted for turning lid 34.

While precautions may be left to the person changing battery 24, the present invention also envisions locking devices to ensure that power has been applied to terminals 30 before battery 24 is removed.

Figure 4:
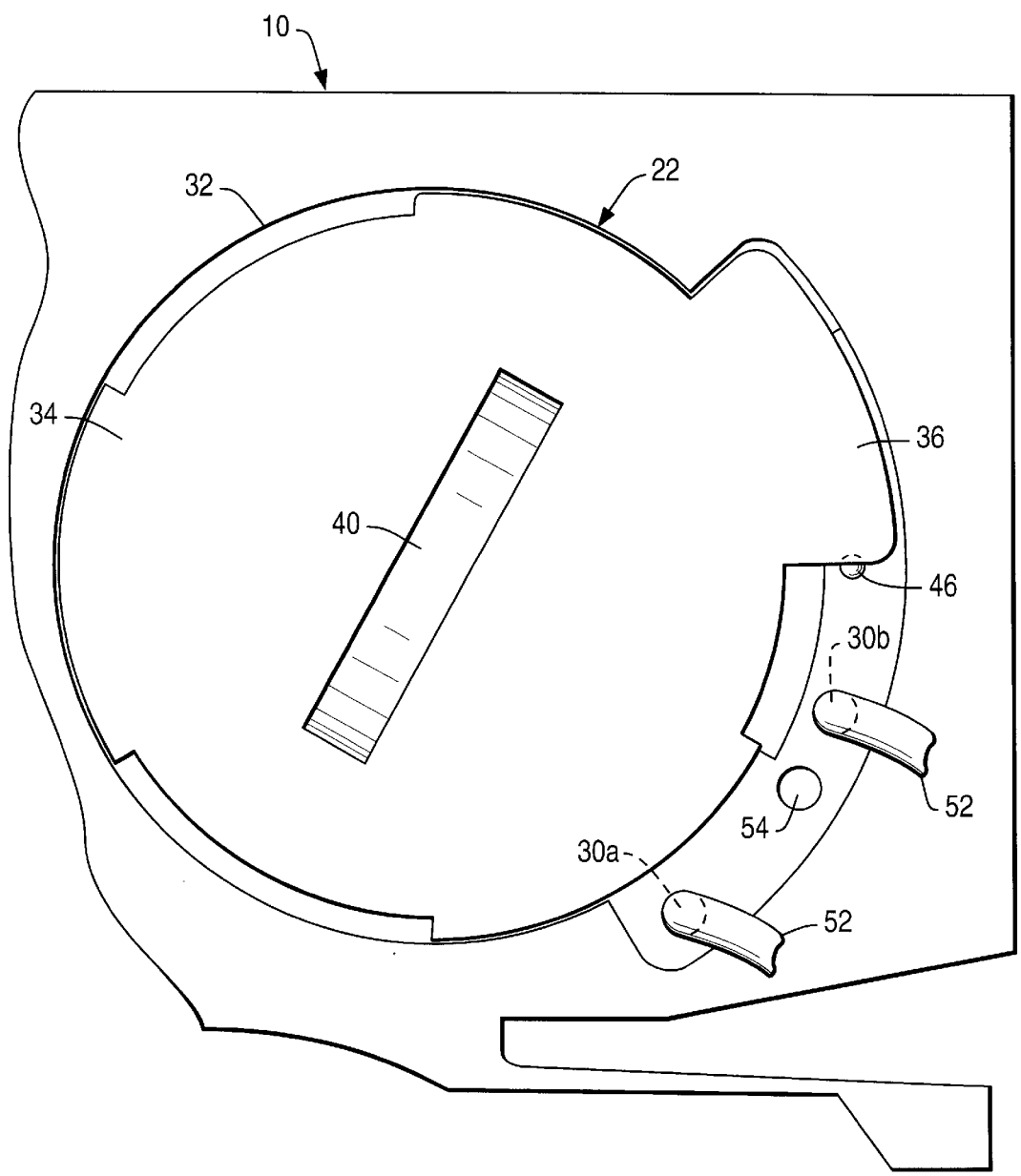
FIG. 4 is a rear view showing the lid of the battery storage apparatus in an open position.

Recess 38 may include key hole 44 and tab stop 46. Key hole 44 receives key 48. Key 48 prevents lid 34 from moving to an open position (FIG. 4). Key 48 is removed after power source pins 52 are inserted into terminals 30.

Tab stop 46 keeps tab 36 from easily moving from the closed position. Tab 36 may be moved past tab stop 46 by applying force.

Power source pins 52 (FIG. 3) are shaped for retention, but also allow for easy removal following battery replacement.

Other locking schemes are also envisioned. For example, key 48 may also be retained in key hole 44 until power source pins 52 are in place within power terminals 30.

Figure 3:
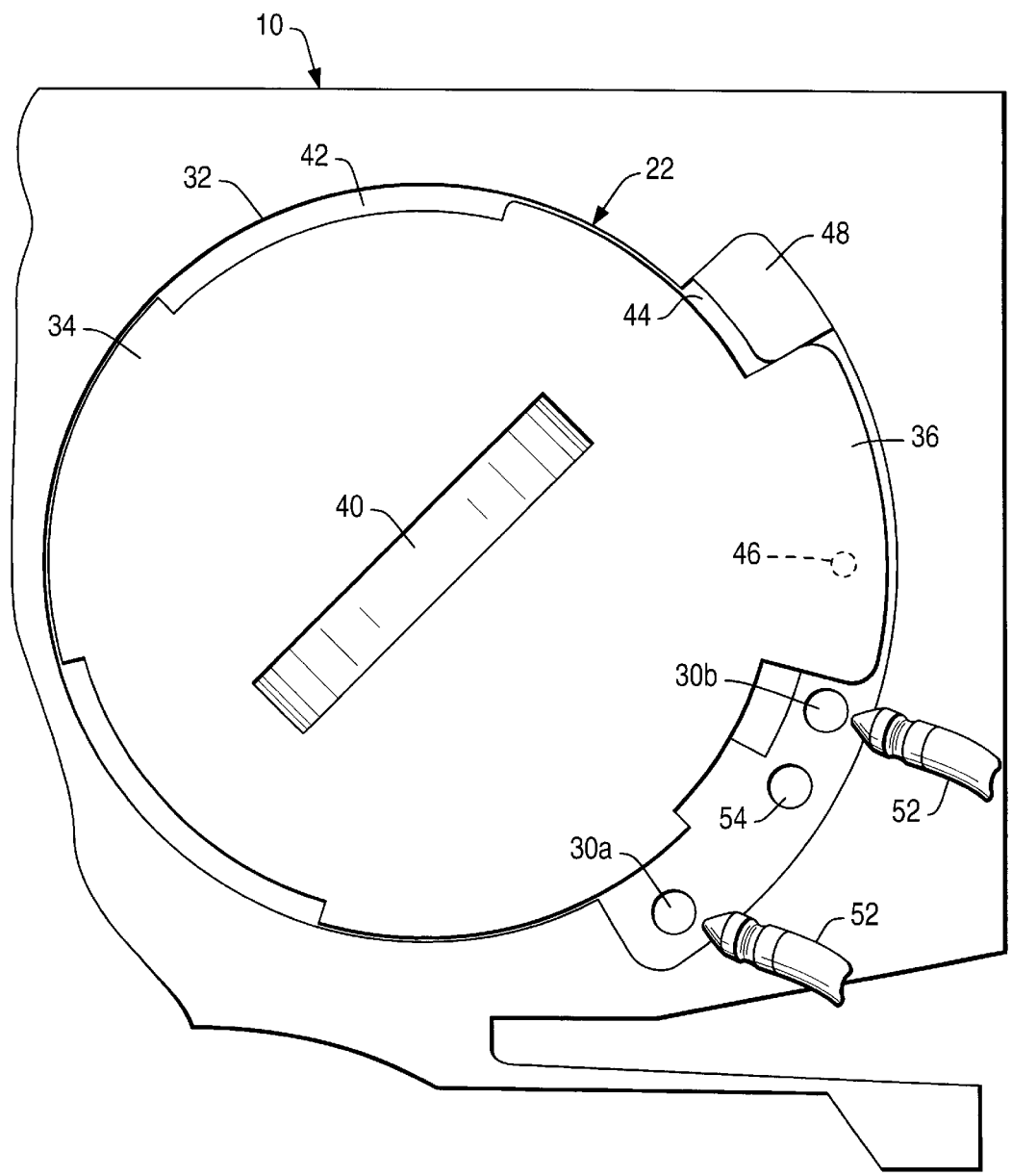
FIG. 3 is a rear view showing the lid of the battery storage apparatus in an intermediate position.

Turning now to FIG. 3, lid 34 is shown in an intermediate position. Power terminals 30 are exposed, but key 48 is still inserted. In this position, power source pins 52 may be inserted into power terminals 30.

Power terminals 30 include terminals 30a and 30b. Terminal 30a accepts positive direct current (DC) voltage. Terminal 30b accepts a ground. Terminal 54 is a reset terminal.

Turning now to FIG. 4, lid 34 is shown in the open position. Key 48 is removed. Power source pins 52 are inserted into power terminals 30. Lid 34 may be removed from threads 42 in battery well 32. Battery 24 may then be removed.

Although the present invention has been described with particular reference to certain preferred embodiments thereof, variations and modifications of the present invention can be effected within the spirit and scope of the following claims.

What is claimed is:

1. A battery storage apparatus in an electronic price label housing comprising:

a battery compartment in the housing;

a generally circular lid which is rotatable between a closed position and an open position, and wherein the lid includes a tab; and power terminals accessible from a rear surface of the housing which provide power to a memory within the electronic price label when a power source is coupled to the power terminals;

wherein the power terminals are covered by the tab when the lid is in the closed position.

* * * * *